US009167823B2

(12) United States Patent
Stooker et al.

(10) Patent No.: US 9,167,823 B2
(45) Date of Patent: Oct. 27, 2015

(54) METHOD OF MECHANICALLY REMOVING SKIN FROM ANIMAL PARTS

(71) Applicant: Foodmate B.V., Oud-Beijerland (NL)

(72) Inventors: Dirk Cornelis Stooker, Puttershoek (NL); Gerrit Hendrik Woltman, Goudswaard (NL); Jacobus Eliza Hazenbroek, Klaaswaal (NL)

(73) Assignee: Foodmate BV (NL)

( * ) Notice: Subject to any disclaimer, the term of this patent is extended or adjusted under 35 U.S.C. 154(b) by 176 days.

(21) Appl. No.: 13/800,177

(22) Filed: Mar. 13, 2013

(65) Prior Publication Data
US 2014/0120816 A1 May 1, 2014

(30) Foreign Application Priority Data

Oct. 29, 2012 (NL) ..................................... 2009718

(51) Int. Cl.
A22C 17/12 (2006.01)
A22C 21/00 (2006.01)

(52) U.S. Cl.
CPC .................................. A22C 21/0092 (2013.01)

(58) Field of Classification Search
USPC .............. 452/125, 127–130, 82–85, 135, 136
See application file for complete search history.

(56) References Cited

U.S. PATENT DOCUMENTS

| 3,956,794 A | 5/1976 | Verbakel |
| 3,969,790 A | 7/1976 | Smorenburg |
| 3,979,793 A | 9/1976 | Hazenbroek |
| 3,983,601 A | 10/1976 | Verbakel |
| 3,990,128 A | 11/1976 | van Mil |
| 4,011,573 A | 3/1977 | Braico |
| 4,034,440 A | 7/1977 | van Mil |
| 4,096,950 A | 6/1978 | Brook |
| 4,118,829 A | 10/1978 | Harben, Jr. |
| 4,131,973 A | 1/1979 | Verbakel |
| 4,147,012 A | 4/1979 | van Mil |

(Continued)

FOREIGN PATENT DOCUMENTS

| EP | 0 736 255 A1 | 10/1996 |
| EP | 0 786 208 A1 | 7/1997 |

(Continued)

OTHER PUBLICATIONS

European Search Report—NL 200574, Jan. 3, 2011, Foodmate B.V.

(Continued)

*Primary Examiner* — Richard Price, Jr.
(74) *Attorney, Agent, or Firm* — Womble Carlyle Sandridge Sandridge & Rice LLP

(57) ABSTRACT

Method of mechanically removing skin from animal parts that have a bone part extending therein, including: obtaining at least one bone holder (16) depending from an overhead conveyor for movement through a given path; obtaining an animal part; holding the animal part from the at least one bone holder (16) by engagement of its bone part; moving the animal part through the given path; engaging an outer surface of the animal part, when moving through the given path, with a perimeter surface (44) of a rotating gripper (38); maintaining a downward force on the animal part on the rotating gripper; entrapping a portion of skin of the animal part between the perimeter surface (44) of the rotating gripper (38) and a fixed knife blade (40); and pulling the skin away from underlying meat of the animal part.

30 Claims, 4 Drawing Sheets

(56) References Cited

U.S. PATENT DOCUMENTS

| | | | |
|---|---|---|---|
| 4,153,971 A | 5/1979 | Simonds | |
| 4,153,972 A | 5/1979 | Harben et al. | |
| 4,178,659 A | 12/1979 | Simonds | |
| 4,203,178 A | 5/1980 | Hazenbroek | |
| 4,283,813 A | 8/1981 | House | |
| 4,292,709 A | 10/1981 | van Mil | |
| 4,388,811 A | 6/1983 | Zebarth | |
| 4,395,795 A | 8/1983 | Hazenbroek | |
| 4,406,037 A | 9/1983 | Hazenbroek | |
| 4,418,444 A | 12/1983 | Meyn et al. | |
| 4,418,445 A | 12/1983 | Meyn et al. | |
| 4,434,526 A | 3/1984 | van Mil | |
| 4,439,891 A | 4/1984 | van Mil | |
| 4,468,838 A | 9/1984 | Sjöström et al. | |
| 4,510,886 A | 4/1985 | van Mil | |
| 4,514,879 A | 5/1985 | Hazenbroek | |
| 4,516,290 A | 5/1985 | van Mil | |
| 4,524,489 A | 6/1985 | van Mil | |
| 4,558,490 A | 12/1985 | Hazenbroek et al. | |
| 4,559,672 A | 12/1985 | Hazenbroek et al. | |
| 4,567,624 A | 2/1986 | van Mil | |
| 4,570,295 A | 2/1986 | van Mil | |
| 4,574,429 A | 3/1986 | Hazenbroek | |
| 4,577,368 A | 3/1986 | Hazenbroek | |
| D283,289 S | 4/1986 | Hazenbroek | |
| 4,593,432 A | 6/1986 | Hazenbroek | |
| 4,597,133 A | 7/1986 | van de Nieuwelaar | |
| 4,597,136 A | 7/1986 | Hazenbroek | |
| 4,635,317 A | 1/1987 | van der Eerden | |
| 4,639,973 A | 2/1987 | van der Eerden | |
| 4,639,974 A | 2/1987 | Olson | |
| 4,639,975 A | 2/1987 | van der Eerden | |
| 4,646,384 A | 3/1987 | van der Eerden | |
| 4,651,383 A | 3/1987 | van der Eerden | |
| 4,653,147 A | 3/1987 | van der Eerden | |
| 4,682,386 A | 7/1987 | Hazenbroek et al. | |
| 4,704,768 A | 11/1987 | Hutting et al. | |
| 4,723,339 A * | 2/1988 | van de Nieuwelaar et al. | 452/130 |
| 4,724,581 A | 2/1988 | van de Nieuwelaar | |
| 4,736,492 A | 4/1988 | Hazenbroek et al. | |
| RE32,697 E | 6/1988 | Hazenbroek et al. | |
| 4,765,028 A | 8/1988 | van de Nieuwelaar et al. | |
| 4,766,644 A | 8/1988 | van den Nieuwelaar et al. | |
| 4,769,872 A | 9/1988 | Hazenbroek et al. | |
| 4,779,308 A | 10/1988 | van de Nieuwelaar et al. | |
| 4,788,749 A | 12/1988 | Hazenbroek et al. | |
| 4,811,456 A | 3/1989 | Heuvel | |
| 4,811,458 A | 3/1989 | v.d. Nieuwelaar et al. | |
| 4,811,462 A | 3/1989 | Meyn | |
| 4,813,101 A | 3/1989 | Brakels et al. | |
| 4,884,318 A | 12/1989 | Hazenbroek | |
| 4,893,378 A | 1/1990 | Hazenbroek et al. | |
| 4,894,885 A | 1/1990 | Markert | |
| 4,896,399 A | 1/1990 | Hazenbroek | |
| 4,899,421 A | 2/1990 | Van Der Eerden | |
| 4,918,787 A | 4/1990 | Hazenbroek | |
| 4,928,351 A | 5/1990 | van den Nieuwelaar et al. | |
| 4,935,990 A | 6/1990 | Linnenbank | |
| 4,939,813 A | 7/1990 | Hazenbroek | |
| 4,958,694 A | 9/1990 | van den Nieuwelaar et al. | |
| 4,965,908 A | 10/1990 | Meyn | |
| 4,972,549 A | 11/1990 | van den Nieuwelaar et al. | |
| 4,993,113 A | 2/1991 | Hazenbroek | |
| 4,993,115 A | 2/1991 | Hazenbroek | |
| 5,001,812 A | 3/1991 | Hazenbroek | |
| 5,013,431 A | 5/1991 | Doets | |
| 5,015,213 A | 5/1991 | Hazenbroek | |
| 5,019,013 A | 5/1991 | Hazenbroek | |
| 5,026,983 A | 6/1991 | Meyn | |
| 5,035,673 A | 7/1991 | Hazenbroek | |
| 5,037,351 A | 8/1991 | van den Nieuwelaar et al. | |
| 5,041,054 A | 8/1991 | van den Nieuwelaar et al. | |
| 5,045,022 A | 9/1991 | Hazenbroek | |
| 5,060,596 A | 10/1991 | Esbroeck | |
| 5,064,402 A | 11/1991 | Koops | |
| 5,067,927 A | 11/1991 | Hazenbroek et al. | |
| 5,069,652 A | 12/1991 | Hazenbroek | |
| 5,074,823 A | 12/1991 | Meyn | |
| 5,088,959 A | 2/1992 | Heemskerk | |
| 5,090,940 A | 2/1992 | Adkison | |
| 5,098,333 A | 3/1992 | Cobb | |
| 5,104,351 A | 4/1992 | van den Nieuwelaar et al. | |
| 5,122,090 A | 6/1992 | van de Nieuwelaar et al. | |
| 5,123,871 A | 6/1992 | van den Nieuwelaar et al. | |
| 5,125,498 A | 6/1992 | Meyn | |
| 5,147,240 A | 9/1992 | Hazenbroek et al. | |
| 5,147,241 A | 9/1992 | Rudin | |
| 5,154,664 A | 10/1992 | Hazenbroek et al. | |
| 5,154,665 E | 10/1992 | Hazenbroek | |
| RE34,149 E | 12/1992 | Markert | |
| 5,173,076 A | 12/1992 | Hazenbroek | |
| 5,173,077 A | 12/1992 | van den Nieuwelaar et al. | |
| 5,176,563 A | 1/1993 | van den Nieuwelaar et al. | |
| 5,176,564 A | 1/1993 | Hazenbroek | |
| 5,178,890 A | 1/1993 | van den Nieuwelaar et al. | |
| 5,186,679 A | 2/1993 | Meyn | |
| 5,188,559 A | 2/1993 | Hazenbroek | |
| 5,188,560 A | 2/1993 | Hazenbroek | |
| 5,194,035 A | 3/1993 | Dillard | |
| 5,197,917 A | 3/1993 | Verbakel et al. | |
| 5,199,922 A | 4/1993 | Korenberg et al. | |
| 5,222,905 A | 6/1993 | Van den Nieuwelaar et al. | |
| 5,242,324 A | 9/1993 | Koops | |
| 5,248,277 A | 9/1993 | Bos et al. | |
| 5,256,101 A | 10/1993 | Koops | |
| 5,269,721 A | 12/1993 | Meyn | |
| 5,277,649 A | 1/1994 | Adkison | |
| 5,277,650 A | 1/1994 | Meyn | |
| 5,279,517 A | 1/1994 | Koops | |
| 5,290,187 A | 3/1994 | Meyn | |
| 5,299,975 A | 4/1994 | Meyn | |
| 5,299,976 A | 4/1994 | Meyn | |
| 5,318,428 A | 6/1994 | Meyn | |
| 5,326,311 A | 7/1994 | Persoon et al. | |
| 5,334,083 A | 8/1994 | van den Nieuwelaar et al. | |
| 5,336,127 A | 8/1994 | Hazenbroek | |
| 5,340,351 A | 8/1994 | Minderman et al. | |
| 5,340,355 A | 8/1994 | Meyn | |
| 5,342,237 A | 8/1994 | Kolkman | |
| 5,344,359 A | 9/1994 | Kolkman | |
| 5,344,360 A | 9/1994 | Hazenbroek | |
| 5,366,406 A | 11/1994 | Hobbel et al. | |
| 5,370,574 A | 12/1994 | Meyn | |
| 5,372,246 A | 12/1994 | van Aalst | |
| RE34,882 E | 3/1995 | Meyn | |
| 5,401,210 A * | 3/1995 | Manmoto et al. | 452/136 |
| 5,429,549 A | 7/1995 | Verrijp et al. | |
| 5,439,702 A | 8/1995 | French | |
| 5,453,045 A | 9/1995 | Hobbel et al. | |
| 5,462,477 A | 10/1995 | Ketels | |
| 5,470,194 A | 11/1995 | Zegers | |
| 5,487,700 A | 1/1996 | Dillard | |
| 5,490,451 A | 2/1996 | Nersesian | |
| 5,505,657 A | 4/1996 | Janssen et al. | |
| 5,549,521 A | 8/1996 | van den Nieuwelaar et al. | |
| D373,883 S | 9/1996 | Dillard | |
| 5,569,067 A | 10/1996 | Meyn | |
| 5,595,066 A | 1/1997 | Zwanikken et al. | |
| 5,605,503 A | 2/1997 | Martin | |
| 5,643,072 A | 7/1997 | Lankhaar et al. | |
| 5,643,074 A | 7/1997 | Linnenbank | |
| 5,672,098 A | 9/1997 | Veraart | |
| 5,676,594 A | 10/1997 | Joosten | |
| 5,704,830 A | 1/1998 | Van Ochten | |
| 5,713,786 A | 2/1998 | Kikstra | |
| 5,713,787 A | 2/1998 | Schoenmakers et al. | |
| 5,741,176 A | 4/1998 | Lapp et al. | |
| 5,755,617 A | 5/1998 | van Harskamp et al. | |
| 5,759,095 A | 6/1998 | De Weerd | |
| 5,766,063 A | 6/1998 | Hazenbroek et al. | |
| 5,782,685 A | 7/1998 | Hazenbroek et al. | |
| 5,785,588 A | 7/1998 | Jacobs et al. | |
| 5,803,802 A | 9/1998 | Jansen | |

(56) References Cited

U.S. PATENT DOCUMENTS

| | | |
|---|---|---|
| 5,810,651 A | 9/1998 | De Heer et al. |
| 5,810,653 A | 9/1998 | Van Craaikamp et al. |
| 5,813,908 A | 9/1998 | Craaikamp |
| 5,827,116 A | 10/1998 | Al et al. |
| 5,833,527 A | 11/1998 | Hazenbroek et al. |
| 5,865,672 A | 2/1999 | Hazenbroek |
| 5,875,738 A | 3/1999 | Hazenbroek et al. |
| 5,947,811 A | 9/1999 | Hazenbroek et al. |
| 5,951,393 A | 9/1999 | Barendregt |
| 5,975,029 A | 11/1999 | Morimoto et al. |
| 5,976,004 A | 11/1999 | Hazenbroek |
| 5,980,377 A | 11/1999 | Zwanikken et al. |
| 6,007,416 A | 12/1999 | Janssen et al. |
| 6,007,417 A | 12/1999 | Jones et al. |
| 6,024,636 A | 2/2000 | Hazenbroek et al. |
| 6,027,403 A | 2/2000 | Hazenbroek et al. |
| 6,027,404 A | 2/2000 | Wols |
| 6,029,795 A | 2/2000 | Janssen et al. |
| 6,033,299 A | 3/2000 | Stone et al. |
| 6,062,972 A | 5/2000 | Visser |
| 6,095,914 A * | 8/2000 | Cornelissen et al. ......... 452/179 |
| 6,126,534 A | 10/2000 | Jacobs et al. |
| 6,126,536 A * | 10/2000 | Kielwasser .................. 452/160 |
| 6,132,304 A | 10/2000 | Aarts et al. |
| 6,142,863 A | 11/2000 | Janssen et al. |
| 6,152,816 A | 11/2000 | van den Nieuwelaar et al. |
| 6,176,772 B1 | 1/2001 | Hazenbroek et al. |
| 6,179,702 B1 | 1/2001 | Hazenbroek |
| 6,190,250 B1 | 2/2001 | Volk et al. |
| 6,193,595 B1 | 2/2001 | Volk et al. |
| 6,220,953 B1 | 4/2001 | Cornelissen et al. |
| 6,231,436 B1 | 5/2001 | Bakker |
| 6,254,471 B1 | 7/2001 | Meyn |
| 6,254,472 B1 | 7/2001 | Meyn |
| 6,277,021 B1 | 8/2001 | Meyn |
| 6,299,524 B1 | 10/2001 | Janssen et al. |
| 6,306,026 B1 | 10/2001 | Post |
| 6,322,438 B1 | 11/2001 | Barendregt et al. |
| 6,358,136 B1 | 3/2002 | Volk et al. |
| 6,371,843 B1 | 4/2002 | Volk et al. |
| 6,375,560 B1 | 4/2002 | Verrijp |
| 6,383,069 B1 | 5/2002 | Volk et al. |
| 6,398,636 B1 | 6/2002 | Jansen et al. |
| 6,446,352 B2 | 9/2002 | Middelkoop et al. |
| 6,478,668 B2 | 11/2002 | Visser et al. |
| 6,530,466 B2 | 3/2003 | Murata et al. |
| 6,599,179 B1 | 7/2003 | Hazenbroek et al. |
| 6,612,919 B2 | 9/2003 | Jansen et al. |
| 6,656,032 B2 | 12/2003 | Hazenbroek et al. |
| 6,726,556 B2 | 4/2004 | Gooren et al. |
| 6,736,717 B1 | 5/2004 | Annema et al. |
| 6,764,393 B1 | 7/2004 | Hazenbroek et al. |
| 6,783,451 B2 | 8/2004 | Aandewiel et al. |
| 6,811,478 B2 | 11/2004 | van den Nieuwelaar et al. |
| 6,811,480 B2 | 11/2004 | Moriarty |
| 6,811,802 B2 | 11/2004 | van Esbroeck et al. |
| 6,830,508 B2 | 12/2004 | Hazenbroek et al. |
| 6,837,782 B2 * | 1/2005 | Hetterscheid et al. ........ 452/179 |
| 6,899,613 B2 | 5/2005 | van den Nieuwelaar et al. |
| 6,912,434 B2 | 6/2005 | van den Nieuwelaar et al. |
| 6,986,707 B2 | 1/2006 | Van Den Nieuwelaar et al. |
| 7,018,283 B2 | 3/2006 | Schmidt et al. |
| 7,029,387 B2 | 4/2006 | van den Nieuwelaar et al. |
| 7,059,954 B2 | 6/2006 | Annema et al. |
| 7,063,611 B2 | 6/2006 | Nolten et al. |
| 7,066,806 B2 | 6/2006 | de Heer et al. |
| 7,070,493 B2 | 7/2006 | Hazenbroek et al. |
| 7,115,030 B2 | 10/2006 | van Hillo et al. |
| 7,125,330 B2 | 10/2006 | Beeksma et al. |
| 7,128,937 B2 | 10/2006 | van den Nieuwelaar et al. |
| 7,133,742 B2 | 11/2006 | Cruysen et al. |
| 7,172,781 B2 | 2/2007 | Kish |
| 7,232,365 B2 | 6/2007 | Annema et al. |
| 7,232,366 B2 | 6/2007 | Van Den Nieuwelaar et al. |
| 7,249,998 B2 | 7/2007 | van Esbroeck et al. |
| 7,261,629 B2 | 8/2007 | Holleman |
| 7,284,973 B2 | 10/2007 | van Esbroeck et al. |
| 7,302,885 B2 | 12/2007 | Townsend |
| 7,344,437 B2 | 3/2008 | Van Den Nieuwelaar et al. |
| D565,941 S | 4/2008 | Peters et al. |
| 7,357,707 B2 | 4/2008 | de Vos et al. |
| 7,476,148 B2 | 1/2009 | McQuillan et al. |
| 7,494,406 B2 | 2/2009 | van Esbroeck et al. |
| 7,530,888 B2 | 5/2009 | Annema et al. |
| 7,572,176 B2 | 8/2009 | Petersen et al. |
| 7,662,033 B1 | 2/2010 | Ritter et al. |
| 7,662,034 B2 | 2/2010 | Van Hillo et al. |
| 7,717,773 B2 | 5/2010 | Woodford et al. |
| 7,740,527 B1 | 6/2010 | Harben |
| 7,744,449 B2 | 6/2010 | van Esbroeck et al. |
| 7,824,251 B2 | 11/2010 | van den Nieuwelaar et al. |
| 7,942,730 B2 * | 5/2011 | Hagendoorn et al. ........ 452/125 |
| 8,272,927 B2 * | 9/2012 | Gasbarro ...................... 452/125 |
| 2001/0023171 A1 | 9/2001 | Hazenbroek et al. |
| 2002/0055328 A1 | 5/2002 | Schmidt et al. |
| 2002/0058470 A1 | 5/2002 | Schmidt et al. |
| 2002/0090905 A1 | 7/2002 | Moriarty |
| 2002/0168930 A1 | 11/2002 | Jansen et al. |
| 2003/0008606 A1 | 1/2003 | Hazenbroek et al. |
| 2003/0084856 A1 | 5/2003 | Hazenbroek et al. |
| 2003/0092372 A1 | 5/2003 | Aandewiel et al. |
| 2004/0198209 A1 | 10/2004 | Hazenbroek et al. |
| 2004/0235409 A1 | 11/2004 | Nolten et al. |
| 2005/0037704 A1 | 2/2005 | Heer et al. |
| 2005/0037705 A1 | 2/2005 | Beeksma et al. |
| 2005/0048894 A1 | 3/2005 | van Hillo et al. |
| 2005/0186897 A1 | 8/2005 | Holleman |
| 2005/0221748 A1 | 10/2005 | Hillo et al. |
| 2006/0099899 A1 | 5/2006 | Hazenbroek et al. |
| 2006/0217051 A1 | 9/2006 | Gerrits |
| 2007/0082595 A1 | 4/2007 | de Vos et al. |
| 2007/0221071 A1 | 9/2007 | Kuijpers et al. |
| 2007/0224306 A1 | 9/2007 | van Esbroeck et al. |
| 2008/0017050 A1 | 1/2008 | van Esbroeck et al. |
| 2008/0125025 A1 | 5/2008 | Van Den Nieuwelaar et al. |
| 2008/0171506 A1 | 7/2008 | Nieuwelaar et al. |
| 2009/0239457 A1 | 9/2009 | Jansen et al. |
| 2009/0320761 A1 | 12/2009 | Grave et al. |
| 2010/0022176 A1 | 1/2010 | Van De Nieuwelaar et al. |
| 2010/0029186 A1 | 2/2010 | Janssen et al. |
| 2010/0048114 A1 | 2/2010 | Van Den Nieuwelaar et al. |
| 2010/0062699 A1 | 3/2010 | Sorensen et al. |
| 2010/0075584 A1 | 3/2010 | Aandewiel et al. |
| 2010/0081366 A1 | 4/2010 | De Vos et al. |
| 2010/0120344 A1 | 5/2010 | Van Den Nieuwelaar et al. |
| 2010/0151779 A1 | 6/2010 | Bakker |
| 2010/0221991 A1 | 9/2010 | Hagendoorn |

FOREIGN PATENT DOCUMENTS

| | | |
|---|---|---|
| EP | 1 353 155 A1 | 10/2003 |
| EP | 1 440 618 | 7/2004 |
| EP | 1 538 113 A1 | 6/2005 |
| EP | 2 018 809 A1 | 1/2009 |
| EP | 2 181 841 A1 | 5/2010 |
| FR | 2 529 177 A1 | 12/1983 |
| GB | 1 395 722 A | 5/1975 |
| WO | WO 00/59311 A2 | 10/2000 |
| WO | WO 02/44670 A1 | 6/2002 |

OTHER PUBLICATIONS

Written Opinion—NL 2004574, Jan. 3, 2011, Foodmate B.V.
PCT/NL2011/050267—International Preliminary Report on Patentability, Oct. 23, 2012, Foodmate B.V.
Search Report in Netherlands Application No. 2006075 dated Jan. 12, 2011.
Office Action in EP Application No. 12 703 612.7 dated May 26, 2014.

* cited by examiner

METHOD OF MECHANICALLY REMOVING SKIN FROM ANIMAL PARTS

TECHNICAL FIELD

The invention relates to a method and apparatus for mechanically removing skin from animal parts. The invention also relates to removing skin from animal parts as an automated inline step of an animal part processing operation. The invention further relates to an apparatus for performing the skin removal step in combination with other steps in the animal part processing method.

BACKGROUND

Being able to automatically remove the skin from the animal parts is of great importance to the food processing industry. Generally, high amounts of saturated fat are found in animal skin. Therefore health conscious consumers prefer skinless meat products, especially skinless poultry products. Furthermore, as removing the skin from the animal part is generally a tedious process, and due to today's convenience society, there is an increasing demand for purchasing animal meat skinless and ready to cook.

Various methods and apparatuses have been developed for removing skin from animal parts. Typically these methods and apparatuses involve feeding an animal part into a skin remover unit. The skin remover unit may include a knife blade, a hold-down roller, a gripper roller, and a stripper roller. The animal part may be feed manually or by means of a conveyer belt into the skin remover unit. The hold-down roller pushes down on the animal part to ensure that the gripper roller grips the skin of the animal part and guides the animal part in respect of the knife blade. The knife blade separates the skin from the animal part, and the gripper roller pulls the detached skin away from the animal part. The detached skin may fall from the gripper roller, or be removed by the stripper roller.

Usually, the skin remover unit is a separate animal part processing station, and operators are manually required to transport the animal parts to the location of the skin remover unit. If animal parts are fed by conveyer belt into the skin remover unit, the animal parts have most likely already been deboned and the animal part may need to be reoriented by an operator to ensure that the best skinning results are achieved.

Accordingly, there is a growing demand for methods and apparatuses that incorporate the automatic skin removal step into food processing lines. Hence, it is an object of the present invention to propose an improved method and apparatus of mechanically removing skin from animal parts in an inline food processing method or apparatus. In a more general sense it is an object of the present invention to overcome or ameliorate at least one of the disadvantages of the prior art. It is also an object of the present invention to at least provide alternative processes and structures that are less cumbersome in use and which can be provided and used relatively inexpensively. At any rate the present invention is at the very least aimed at offering a useful choice and contribution to the existing art.

SUMMARY

To this end the present invention provides a method of mechanically removing skin from animal parts that have a bone part extending therein, as defined in the appended claims. The method including: providing at least one bone holder depending from an overhead conveyor for movement through a given path; providing an animal part with the bone part therein; holding the animal part from the at least one bone holder by engagement of its bone part by the at least one bone holder; moving the animal part through the given path; engaging an outer surface of the animal part, when moving through the given path, with a perimeter surface of a rotating gripper; maintaining a downward force on the animal part on the rotating gripper; entrapping a portion of skin of the animal part between the perimeter surface of the rotating gripper and a fixed knife blade; and pulling the skin away from underlying meat of the animal part.

The present invention allows the skin of an animal part to be removed as an automated inline processing step, specifically an automated inline processing step arranged along an overhead conveyor system, where animal parts are held from above by bone holders. Optionally the overhead conveyor is an overhead conveyor chain made up of individual chain links and the at least one bone holder is depending from a chain link.

The overhead conveyor moves the animal part held from the bone holder through the given path. While travelling through the given path, the animal part may encounter different processing steps, and specifically the processing steps for removing the skin of the animal part. Therefore this method lends itself to incorporating the skin removal step in a meat processing operation.

Optionally, the bone part is an elongate bone part extending through the animal part and has a bone portion protruding outwardly from the animal part. Optionally, the outwardly protruding bone portion is a bone knuckle. The bone knuckle provides a natural and convenient way of holding the animal part from the bone holder. Optionally, the animal part is an item of poultry. Optionally, the item of poultry is one of a group consisting of chicken, quail, turkey, duck, swan, and goose.

In the method according to the present invention, while travelling through the given path, the animal part encounters the rotating gripper. The outer surface of the animal part is engaged by the perimeter surface of the rotating gripper. Optionally, the perimeter surface has protrusions extending outwardly and possibly but not necessarily in the direction of rotation of the rotating gripper. This helps ensure that the rotating gripper sufficiently engages the outer surface of the animal part. Optionally, the rotating gripper is implemented as a roller.

Maintaining a downward force on the animal part on the rotating gripper helps the rotating gripper engage the outer surface of the animal part. Optionally, the downward force is gravity. It has been found that the downward force exerted on the animal part by gravity is sufficient. Optionally, the downward force may be changed, by varying the distance between the animal part held by the bone holder and the rotating gripper. In the case that more downward force is necessary, the distance between the rotating gripper and the bone holder may be decreased. As the rotating gripper engages the skin of the animal part, the animal part, which is held securely by the bone holder, is squeezed between the overhead conveyor and the rotating gripper. As the meat on the animal part is resilient, the animal part passes over the rotating gripper, and the outer skin surface of the animal part is gripped sufficiently.

Optionally, the perimeter surface of the rotating gripper moves at a speed that exceeds a speed at which the overhead conveyor moves. When the perimeter surface of the rotating gripper travels faster than the overhead conveyor, the skin of the animal part is more reliably engaged and entrapped resulting in better skin removal and less waste.

Optionally, the outer surface of the animal part is engaged by the perimeter surface of the rotating gripper prior to entrapping a portion of skin of the animal part between the perimeter surface of the rotation gripper and the fixed knife blade. In this case, the perimeter surface is sufficiently engaged before the fixed knife blade cuts away the skin of the animal part, resulting in better skin removal.

Optionally, the method further includes providing a rotating cleaning member for cleaning the rotating gripper. The rotating cleaning member prevents chunks of removed skin from being retained on the rotating gripper. Retained chunks could result in uneven skin removal and/or contamination.

Optionally, the method further includes rotating the cleaning member in the same direction as the rotating gripper. It has been found that rotating the cleaning member in the same direction as the rotating gripper increases the cleaning efficiency of the rotating gripper. It is also conceivable that the rotating cleaning member is provided with protrusions that engage and knock retained skin and/or chunks of skin off the rotating gripper.

Optionally, the cleaning member is rotated at a higher rate than the rotating gripper. When the cleaning member is rotated faster than the rotating gripper retained skin and/or chunks of retained skin on the rotating gripper may be removed before that portion of the perimeter surface of the rotating gripper engages the outer surface of the same animal part and/or a next animal part.

Optionally, the method is part of a meat processing operation. On account of the method being executed as inline steps, the method according to the invention, removing the skin of the animal part, may be incorporated in a meat processing operation. Optionally, the meat processing operation is one for separating meat from thigh bones.

Optionally, the animal part is a thigh and the bone part grasped by the bone holder is a hip or knee knuckle, and wherein the meat processing operation further includes the automated individual processing steps of: cutting tissue near a hip knuckle; cutting tissue adjacent a knee knuckle; engaging the thigh bone adjacent the bone holder with a meat stripper; moving the bone holder and meat stripper away from one another in a direction substantially coextensive with the longitudinal extend of the thigh bone; allowing the meat stripper to pass over the knee knuckle; and collecting the meat separated from the bone.

Including the present invention in the meat processing operation for separating meat from thigh bones, allows thigh meat to be essentially completely processed in a single meat processing operation, without operator interaction.

Optionally, the skin from thigh is removed prior to separating the meat from the bone part extending therein. Best results have been achieved by first removing the skin of the thigh and then performing the steps necessary for separating the meat from the bone.

Also according to the invention an apparatus is provided for performing the method according to the invention, including at least one processing station for carrying out the method steps. The at least one processing station is arranged along a path of conveyance defined by an overhead conveyor moving through a predefined path. A bone holder is depending from the overhead conveyor; and wherein the at least one processing station comprises a skin remover unit including a rotating gripper and a fixed knife blade operatively arranged to, in use, engage, entrap and pull a portion of skin of an animal part between a perimeter surface of the rotating gripper and the fixed knife blade.

Optionally, the rotating gripper is implemented as a roller.
Optionally, the skin remover unit further includes a rotating cleaning member. Optionally, the rotation cleaning member is also implemented as a roller. The roller is slightly wider than the width of the animal part to be skinned held in position by the bone holder. Furthermore, the apparatus is modular, and may include different processing stations for performing different method steps. Optionally, the bone holder is rotatably depending from the overhead conveyor. In certain method steps it may be desirable that the animal part is rotated by the bone holder substantially coextensive with a longitudinal extend of the bone of the animal part.

Optionally, the rotating gripper is made from stainless steel. In practice, most of the food processing apparatus is manufactured from stainless steel. Hygiene is extremely important in the food industry and stainless steel is easy to clean and immune to corrosion. Optionally, the rotating cleaning member is made from plastic. The rotating cleaning member may also include protrusions or teeth for better removing excess skin or retained skin or fat from the rotating gripper.

Optionally, a first edge of the fixed knife blade extends parallel to the rotating gripper and substantially perpendicular to the direction of conveyance of the conveyor, and a main body of the fixed knife blade extends substantially tangentially to the perimeter contour of the rotating gripper. As the distance of the animal part from the bone holder depending from the overhead conveyor to a far end of the animal part is fixed, it is may be preferable that the first edge of the fixed knife blade is substantially parallel to an axis of rotation of the rotating gripper and generally perpendicular to the direction of conveyance of the overhead conveyor. It may further be preferred that a main body of the fixed knife blade is also tangential to the perimeter of the rotating gripper. As a result only the skin is removed, and the remaining animal part and meat pass over the first edge of the fixed knife blade. The outer skin surface of the animal part is thus efficiently separated from the remaining animal part including the meat and bone.

Optionally, the knife blade is adjustable relative to the gripper. This facilitates versatility. The apparatus can then be used for different types of animal parts having different skin thicknesses.

Optionally, the skin remover unit is height adjustably mounted to a machine frame via an arm. This feature also increases the versatility of the apparatus. The desired distance from the overhead conveyor and bone holder to the fixed knife blade and rotating gripper depends on the animal part being processed. As animal parts vary in size, for example, a chicken thigh is smaller than a turkey thigh, it is desirable that the entire skin remover unit may be adjusted relative to the overhead conveyor and the bone holder to accommodate for the processing of different types of animals and/or different types of animal parts. The height adjustability may also be convenient to vary the downward force of the animal part on the fixed knife blade and the rotating gripper.

Optionally, the arm is rotatable about the machine frame about a pivot axis extending in a plane substantially parallel to the overhead conveyor. The location of the skin remover unit may vary along the overhead conveyor. However, it is important that the skin remover unit be located inline with the overhead conveyor. Therefore an arm pivotable on the machine frame is suitable for effectuating a change in distance relative to the overhead conveyor without the skin remover unit becoming too much misaligned from a substantially parallel orientation and moving out from under the virtual line created by the overhead conveyor.

Optionally, the arm is pivotally adjustable with respect to the machine frame and pivoted about a mount point by an adjustment screw that supports the arm at a contact point located on the arm away from the mount point. The adjustment screw may be used to tune the distance between the skin remover unit and the overhead conveyor. This change in distance will also result in a slight change in the location and angular position of the skin remover unit along the overhead conveyor. Optionally, the arm is capable of travelling within 45 degrees above and below the virtual reference line defined to be parallel to the overhead conveyor.

Optionally, the overhead conveyor path is arranged in a closed loop and the closed loop is defined by first and second carousels, connecting parallel first and second linear conveyor sections. Such a setup increases the processing area of the overhead conveyor and provides a method of driving the overhead conveyor. Optionally, the second carousel is driven for rotation, and wherein the first carousel is idle and driven indirectly by the overhead conveyer.

Optionally, in use, the skin remover unit is arranged at a distance from the overhead conveyor such that the animal part is first engaged by the perimeter surface of the rotating gripper, before coming in contact with the fixed knife blade. Conveniently this implies that the end of the animal part travels along a path that is lower than the fixed knife yet higher than a middle of the rotating gripper.

Optionally, the at least one processing station further comprises a bone hanger station, a first tissue cutting station, a second tissue cutting station, and a meat stripper station. As mentioned above, the apparatus is modular and lends itself well to the incorporation of additional processing stations for carrying out additionally processing steps.

Optionally, the skin remover unit, is arranged after the bone hanger station, and before the meat stripper station. As stated while discussing the method according to the invention it is preferable that the skin of the animal part is removed prior to stripping the meat from the animal part.

Although the method according to the present invention and the apparatus for performing the method according to the present invention are discussed in different sections, it will be appreciated that the above description and features of the method according to the invention are also applicable to the apparatus according to the invention, and that the above description and features of the apparatus according to the invention are also applicable to the method according to the invention.

The aspects as covered by the appended claims as well as other aspects, features and advantages of the invention will be explained in further detail in the description below in reference to the accompanying drawings briefly described below.

DETAILED DESCRIPTION

Figure 1:
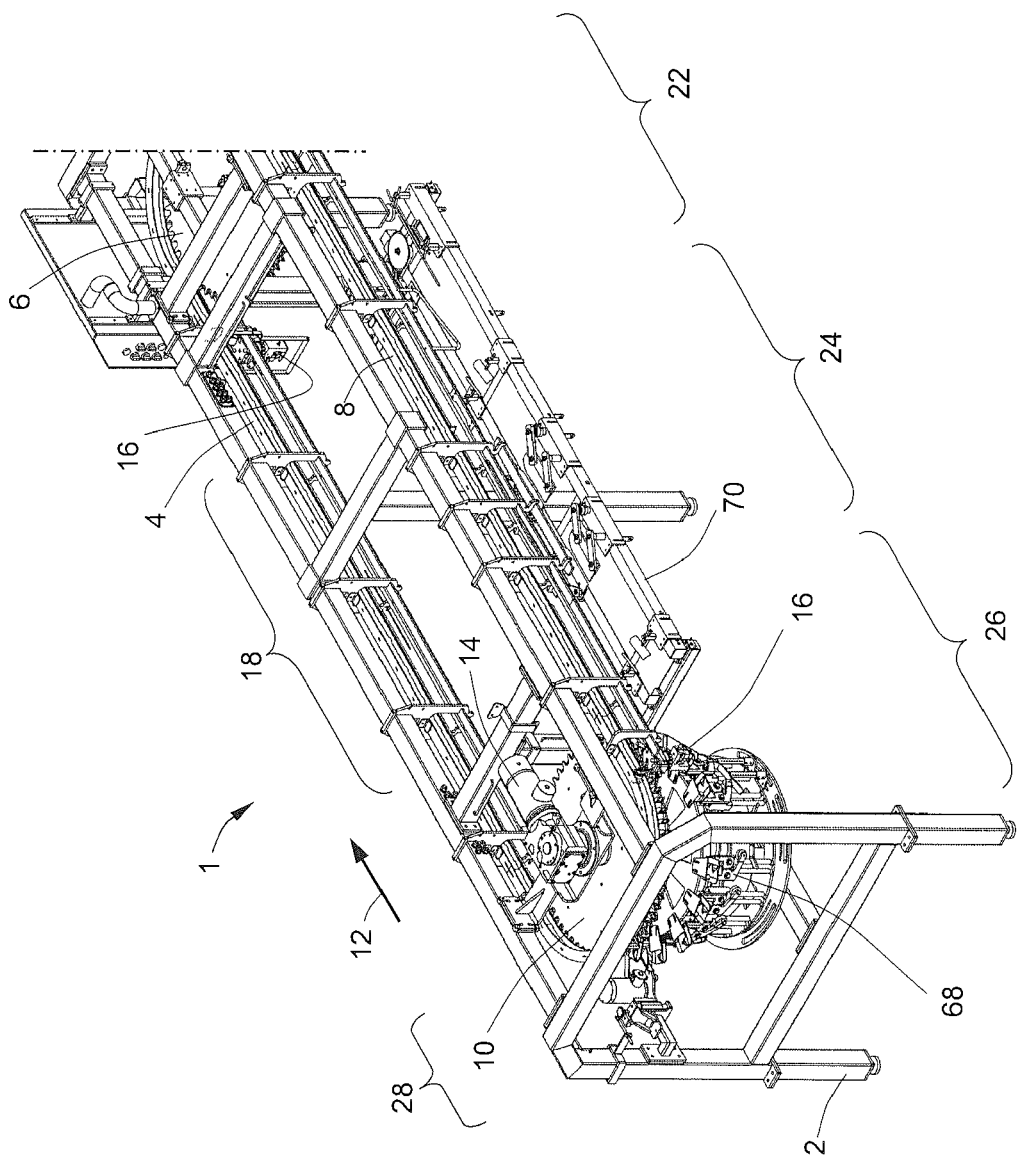
FIG. 1 is a first partial bird's eye perspective view of an embodiment of the apparatus according to and for performing the method of the present invention.
Figure 2:
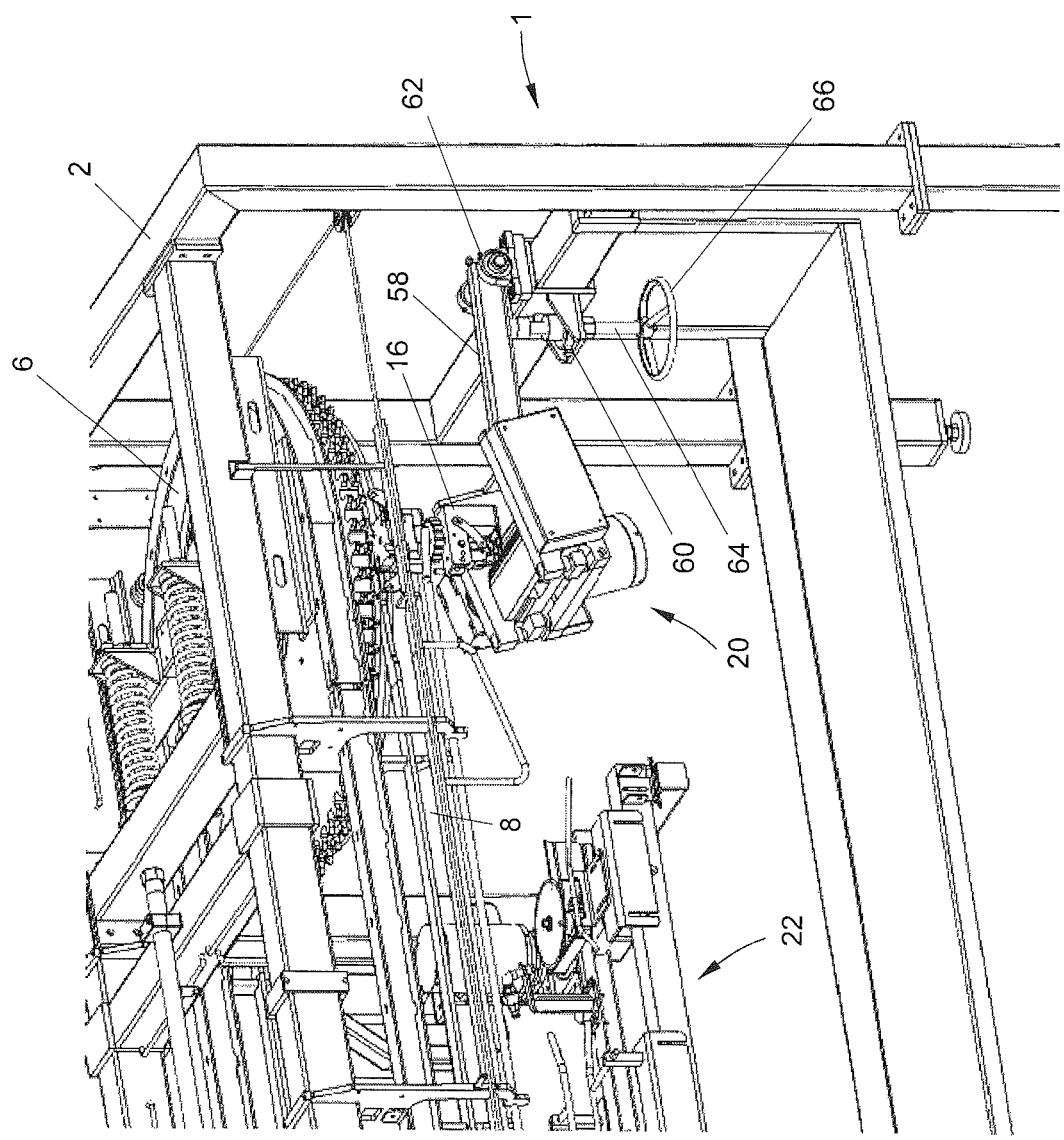
FIG. 2 is a second partial bird's eye perspective view of an enlarged detail of the apparatus according to and for performing the method of the present invention.

The apparatus 1 according to a first embodiment of the invention as shown in FIGS. 1 to 4. In the example of FIGS. 1 and 2, the apparatus 1 is a meat processing machine for removing the skin of chicken thighs and subsequently separating the meat from the thigh bones. The apparatus 1 has an overhead conveying means that is defined by a first linear conveyor section 4, a first carousel 6, a second linear conveyor section 8 and a second carousel 10. The overhead conveying means includes a conveyor chain (not shown but conventional) that is arranged for movement in the direction of arrow 12. The conveyor chain is driven for movement by the second carousel 10 that is provided for this purpose with an electric drive motor 14 that may drive the carousel 10 through a gear reduction. The first carousel 6 is mounted for idle rotation and is driven indirectly by the conveyor chain, as is conventional for such overhead conveying systems for moving article hangers, such as bone holder 16, through a processing path defined by the conveying means. All the basic elements described thus far are mounted on an apparatus or machine frame, generally indicated with reference numeral 2. The apparatus 1, in accordance with the direction of conveyance of arrow 12 (FIG. 1), can be distinguished by a loading station 18, a skin remover unit 20 (FIG. 2), a first tissue cutting station 22, a second tissue cutting station 24 and a meat stripping and discharge station 26 incorporating a third tissue cutting station 28.

Figure 3:
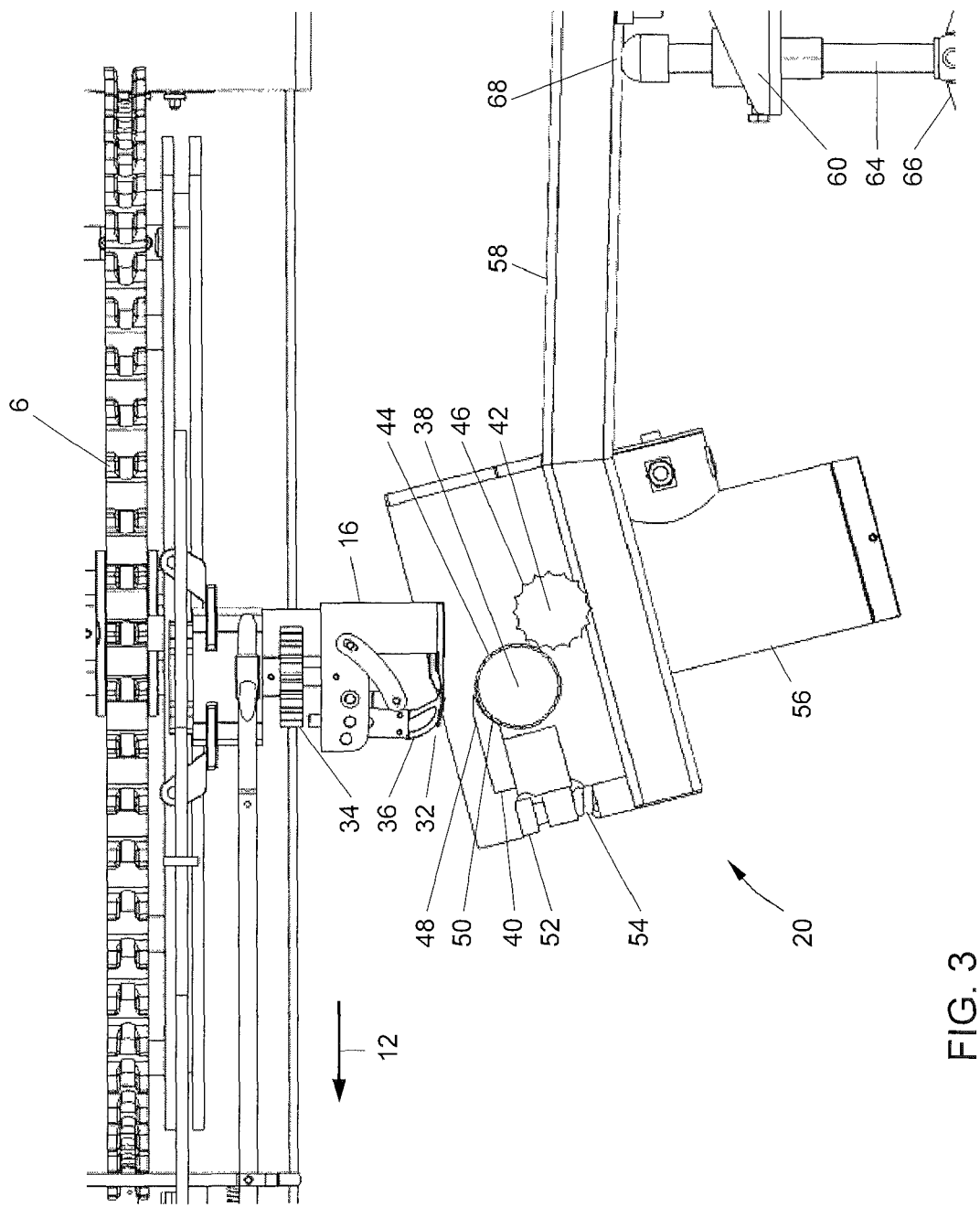
FIG. 3 is a partial side view of the skin remover unit of the apparatus according to and for performing the method of the present invention.
Figure 4:
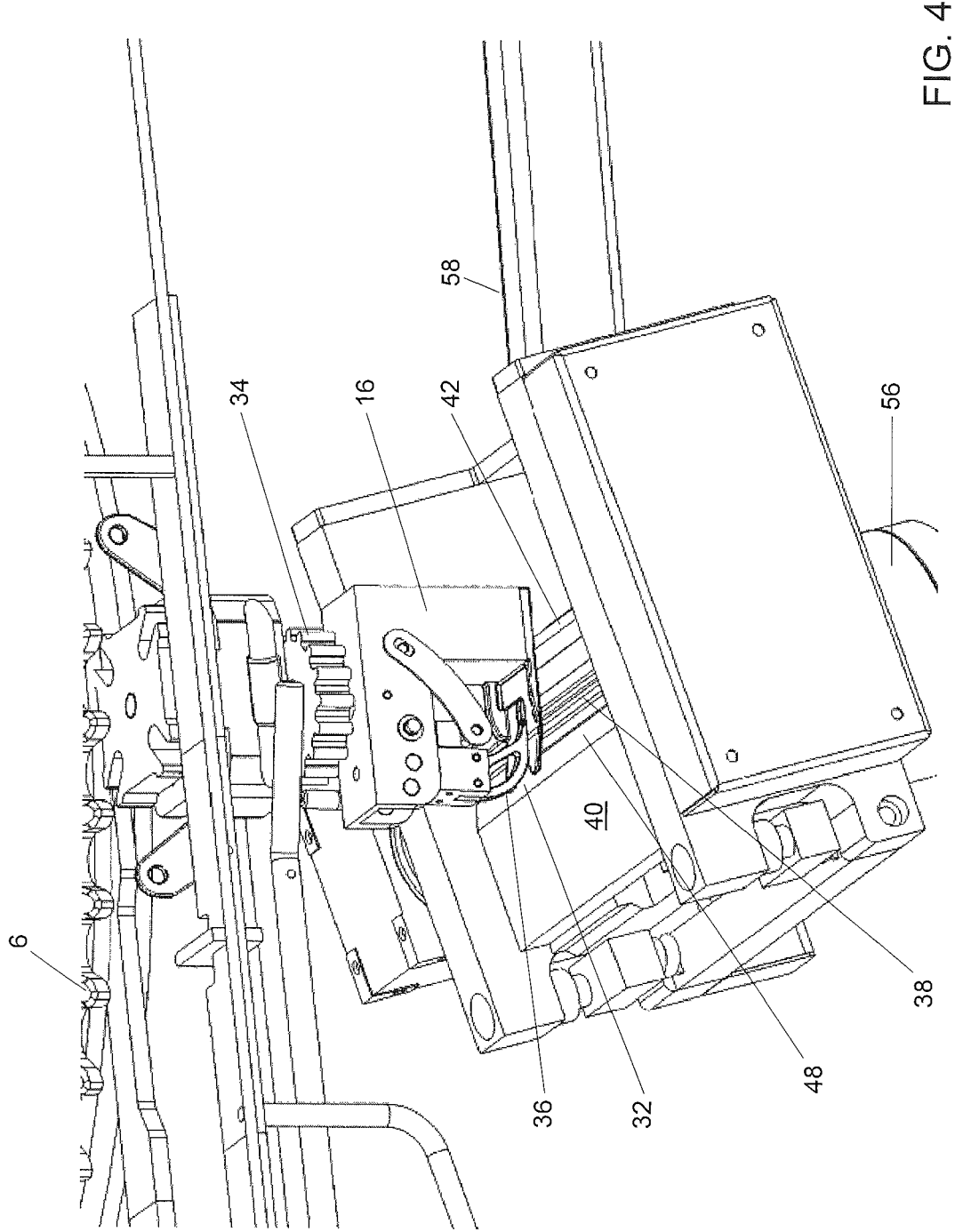
FIG. 4 is a partial perspective view of the skin remover unit of the same embodiment of the apparatus according to and for performing the method of the present invention.

As best seen in FIGS. 3 and 4, the bone holder 16, at the loading station 18, is presented with a receiving end 32 opening to the exterior of the apparatus 1. While only one bone holder 16 is shown in each of FIGS. 1 and 2, for clarity, it is to be understood that a plurality of such bone holders 16 will be present and spaced at regular intervals along the overhead conveyor. Such arrangements are in itself conventional and require no further explanation. The bone holder 16, in this embodiment, is adapted to receive and support the knee knuckle (condylus) of the thigh bone (femur) of a chicken, with the hip knuckle (caput femoris) hanging substantially vertically downwardly. Furthermore, the receiving end 32 of the bone holder 16 is rotatable by a turning gear 34. (For details of the bone holder 16, reference is made to FIGS. 3 and 4)

The conveyer chain is formed in such a way that the chain is not limited to substantially lateral movement. Although not pictured in this embodiment, it is possible that the conveyer chain undergoes a change in elevation.

After the animal part, in this example a chicken thigh, has been inserted into the receiving end 32 of the bone holder 16, preferably the animal thigh is positioned with the front part of the knee knuckle facing outwards from the machine, the bone holder's swivelable locking arm 36 locks the thigh bone in place. Furthermore, the bone holder 16 is rotated such that the receiving end 32 of the bone holder travels in the conveyance direction defined by arrow 12 leading with the receiving end 32. From the first carousel 6 the bone holders 16 will advance along the overhead conveyor to its second linear section 8 and enter the skin remover unit 20 positioned at the perimeter of the first carousel 6. The skin remover unit 20 is depicted in FIGS. 3 and 4, and includes a rotating gripper 38 and a fixed knife blade 40 operatively arranged to, in use, engage, entrap and pull a portion of skin of an animal part between a perimeter surface 44 of the rotating gripper 38 and the fixed knife blade 40. In this embodiment the skin remover unit 20 further includes a rotating cleaning member 42.

Both the rotating gripper 38 and the rotating cleaning member 42 are, in this example, implemented as rollers. These rollers 38, 42 are arranged parallel to one another with their axes of rotation extending perpendicular to the direction of conveyance 12, and have an axial length that makes them slightly wider than the width of the animal part to be skinned held in position by the bone holder 16. The rotating gripper 38, in this example, is manufactured from stainless steel and has a rough outer perimeter surface 44 to improve and/or increase the engagement of the outer surface of the animal part. The rotating cleaning member 42 is manufactured from plastic, in this example, and has a plurality of protrusions 46 extending from a perimeter surface of the roller. These protrusions 46 aid in removing retained skin and/or retained skin chunks including fat from the rotating gripper 38.

The perimeter surface 44 of the rotating gripper 38 rotates towards the fixed knife blade 40 in the same direction as the direction of conveyance indicated by arrow 12. Furthermore, the linear speed measured at the perimeter surface 44 of the rotating gripper 38 exceeds a linear speed at which the overhead conveyor moves above the skin remover unit 20. Additionally, the cleaning member 42 is rotated in the same direction as the rotating gripper 38 and at an angular velocity that exceeds the angular velocity of the rotating gripper 38. Both the rotating gripper 38 and the rotating cleaning member 42 are driven by an electric motor 56.

As best seen in FIG. 3, a first edge 48 of the fixed knife blade 40 extends parallel to the rotating gripper 38 and substantially perpendicular to the direction of conveyance, indicated by arrow 12, of the overhead conveyor. The first edge 48 is positioned about the perimeter contour of the rotating gripper 38 to define a gap between the perimeter surface 44 and the first edge 48. A second edge 50 of the fixed knife blade 40 is positioned about the contour of the rotating gripper 38, in this case a roller, at a location below the first edge 48. The fixed knife blade 40 has its main body extending generally tangentially with respect to the rotating gripper 38 and is adjustable. Adjustment being accomplished by resilient member 54 and adjustment screw 52, relative to the rotating gripper to accommodate a wide variety of animal skin thicknesses.

The skin remover unit 20 is, in this example, adjustably mounted to a machine frame 2 via an arm 58, and a bracket 60. This is shown in both FIGS. 2 and 3. The skin remover unit 20 is attached to a first end of the arm 58, and a second opposite end of the arm 58 is pivotally mounted at a mount point 62 to the bracket 60, which in turn is mounted to the machine frame 2. Adjusting the bracket 60 laterally along the machine frame 2 allows the skin remover unit 20 to be aligned to the virtual center line of a path of conveyance defined by the second linear conveyor section 8 of the overhead conveyor.

An adjustment screw spindle 64 supports the arm 58 at a contact point 68 located on the arm 58 spaced away from the mount point 62. Adjusting the adjustment screw spindle 64 by a hand wheel 66 results in the skin remover unit 20 pivoting about the mount point 62 in a height direction with respect to the machine frame 2. This allows the distance from the skin remover unit 20 to the bone holder 16 to be varied without the skin remover unit 20 becoming misaligned, because the height adjustment is independent of the lateral adjustability. The change in distance of the skin remover unit 20 from the overhead conveyor and bone holder 16 will also result in a slight change in the elevation angle of the skin remover unit 20, and in its up- and downstream location along the second linear conveyor section 8 of the overhead conveyor. These slight positional changes do not affect the efficiency of the skin remover unit 20 or the apparatus 1.

Being able to set the desired vertical distance from the overhead conveyor and bone holder 16 to the fixed knife blade 40 and rotating gripper 38 is preferred for processing different animal parts from different animals. Animal parts vary in size and although the apparatus 1 is for processing chicken thighs, which do differ somewhat in length, it is also conceivable that the apparatus 1 may be used to process turkey thighs, which are larger, during another shift.

In use an outer surface of the animal part held by the bone holder 16 travelling through the conveyer path in the direction of conveyance, indicated by arrow 12, is first engaged by the perimeter surface 44 of the rotating gripper 38. A downward force is maintained on the animal part on the rotating gripper 38. The downward force, in this example, is gravity and results from the distance between the bone holder 16 and the skin remover unit 20 being set such that the outer surface of the animal part is first engaged by the perimeter surface 44 of the gripper roller 38. The outer surface of the animal part first engages the perimeter surface 44 at a position located approximately at a middle of the gripper roller 38, below the fixed knife blade 40, and above the rotating cleaning member 42. The downward force is further created by cooperation of the distance of the bone holder 16 with respect to the rotating gripper 38, the specific length of the animal part, its inherent stiffness, and its inherent flexibility. Therefore as the animal part travels along the conveying path it is pressed/urged by the bone holder 16 against the perimeter surface 44 of the rotating gripper 38. As the animal part, a chicken thigh in this example, is held securely by the bone holder 16, as the outer of the animal part is engaged by the perimeter surface 44 of the rotating gripper 38, the animal meat is pushed against the perimeter surface 44 of the rotating gripper 38 resulting in better engagement.

Next, a portion of skin of the animal part is entrapped between the perimeter surface 44 of the rotating gripper 38 and the first and second edges 48, 50 of the fixed knife blade 40. The skin of the animal is subsequently pulled away from underlying meat of the animal part. The skin to be detached is engaged by the perimeter surface 44 of the rotating gripper 38, and is directed downward along the rotating gripper 38 by the second edge 50 of the fixed knife blade 40. The first edge 48 of the fixed knife blade 40 continues separating and guiding the meat of the animal part away from the skin. As the skin is removed from the animal part portions of the removed skin will fall from the rotating gripper 38 on a generally downwardly inclined chute surface of the skin remover unit 20. If portions of the removed skin or fat remain engaged to the rotating gripper 38, the rotating cleaning member 42 and its protrusions 46 knock off the remaining removed skin from the rotating gripper 38, keeping the rotating gripper 38 clean.

Since the linear speed of the perimeter surface 44 of the rotating gripper 38 exceeds the linear speed of the overhead conveyor the entire part of animal meat can be processed during the short time it takes for the animal part to travel through the skin remover station comprising the skin remover unit 20.

After passing over the skin remover unit 20, the animal part held by the bone holder 16 enters the first tissue cutting station 22 followed by the second tissue cutting station 24. In this embodiment the first and second tissue cutting stations 22, 24 are mounted on a sub-frame 70, which is preferably height adjustably mounted on the machine frame 2.

The first tissue cutting station 22 comprises a circular rotating cutting blade driven by an electric motor. The rotating cutting blade is opposite a thigh bone guiding means which engages the knee knuckle and assists in positioning the individual knee ends of the animal part for cutting tissue by the circular cutting blade. The predetermined position is such that the back portion of the bone shaft directly adjacent to the knee knuckle passes against cutting blade, for cutting tissue that connects the meat to the bone. Thereby, such tissue is severed that is positioned adjacent the back of the knee knuckle end of the thigh bone.

Next the animal part progresses through the second tissue cutting station 24. The animal part successively passes through a first set of parallel knife blades, and a second set of parallel knife blades. The bone holders 16 are rotated through the turning gears 34 while passing through the second tissue cutting station 24.

The meat stripping and discharge station 26 includes the second carousel 10 that receives the bone holders 16 from the second linear conveyer section 8 after these have been advanced through the second tissue cutting station 24. The meat stripping and discharge station 26 also incorporates, in this embodiment, a third tissue cutting station 28.

In this example, conventional meat stripper units 68 each have gripper plates closing around the bone shaft adjacent to the knee knuckle, and then undergo a vertically downward movement which strips the meat from the bone. At the bottom of the bone, the gripper plates open slightly to allow the gripper plates to pass over the hip knuckle region of the thigh bone. Because the tissue holding the meat to the hip knuckle region of the thigh bone has already been severed sufficiently, the continued downward movement of the meat stripper unit will remove the meat from the thigh bone. This removed meat may then be collected by gravity in a collecting tray or alternatively by a collecting conveyer placed underneath the second carousel 10.

In order to further reduce waste and ensure that no meat clings to the thigh bone, in this example, the animal part passes through a third tissue cutting station 28 after the meat stripping station 26. Any tissue still holding any meat is cut, and also collected by gravity in the collecting tray or alternatively by the collecting conveyer placed underneath the second carousel 10.

After removal of all the meat, the bone holders 16 continue their movement around the second carousel 10 and release the bone part from which the meat has been removed. Suitable means may additionally be provided to collect the discharged thigh bones, such as trays or conveyors (not shown but conventional).

Accordingly method of mechanically removing skin from animal parts that have a bone part extending therein is disclosed. The method includes: providing at least one bone holder 16 depending from an overhead conveyor for movement through a given path; providing an animal part with the bone part therein; holding the animal part from the at least one bone holder 16 by engagement of its bone part by the at least one bone holder 16; moving the animal part through the given path; engaging an outer surface of the animal part, when moving through the given path, with a perimeter surface 44 of a rotating gripper 38; maintaining a downward force on the animal part on the rotating gripper 38; entrapping a portion of skin of the animal part between the perimeter surface 44 of the rotating gripper 38 and a fixed knife blade 40; and pulling the skin away from underlying meat of the animal part.

It is thus believed that the operation and construction of the present invention will be apparent from the foregoing description. To the skilled person in this field of the art it will be clear that the invention is not limited to the embodiment represented and described here, but that within the framework of the appended claims a large number of variants are possible. Also kinematic inversions are considered inherently disclosed and to be within the scope of the present invention. The terms comprising and including when used in this description or the appended claims should not be construed in an exclusive or exhaustive sense but rather in an inclusive sense. Expressions such as: "means for . . ." should be read as: "component configured for . . ." or "member constructed to . . ." and should be construed to include equivalents for the structures disclosed. The use of expressions like: "critical", "preferred", "especially preferred" etc. is not intended to limit the invention. Features which are not specifically or explicitly described or claimed may be additionally included in the structure according to the present invention without deviating from its scope.

What is claimed is:

1. Method of mechanically removing skin from animal parts that have a bone part extending therein, the method including:
   obtaining at least one bone holder associated with a conveyor for moving the bone holder through a given path;
   obtaining an animal part with the bone part therein;
   holding the animal part with the at least one bone holder by engagement of its bone part by the at least one bone holder;
   moving the animal part through the given path;
   engaging an outer surface of the animal part, when moving through the given path, with a rotating gripper means having an axis of rotation extending substantially perpendicular to the direction of movement of the animal part through the given path;
   maintaining a force on the animal part when it is in engagement with the gripper means;
   entrapping a portion of skin of the animal part between a gap of the gripper means; and
   pulling the skin away from underlying meat of the animal part.

2. Method according to claim 1, wherein the bone part is an elongate bone part extending through the animal part and has a bone portion protruding outwardly from the animal part.

3. Method according to claim 2, wherein the outwardly protruding bone portion is a bone knuckle.

4. Method according to claim 1 wherein the gripper means include a perimeter surface of a rotating gripper and a fixed knife blade, and wherein the gap of the gripper means is formed between the perimeter surface of the rotating gripper and a fixed knife blade.

5. Method according to claim 4, wherein the outer surface of the animal part is engaged by the perimeter surface of the rotating gripper prior to entrapping a portion of skin of the animal part between the perimeter surface of the rotation gripper and the fixed knife blade.

6. Method according to claim 4 further including cleaning the rotating gripper by a rotating cleaner member.

7. Method according to claim 6, further including rotating the cleaning member in the same direction as the rotating gripper.

8. Method according to claim 7, wherein the cleaning member is rotated at a higher rate than the rotating gripper.

9. Method according to claim 4, wherein the perimeter surface of the rotating gripper moves at a speed that exceeds a speed at which the conveyor moves.

10. Method according to claim 1 wherein the downward force is created by at least one of a distance of the bone holder with respect to the gripper means, a length of the animal part, an inherent stiffness of the animal part, and flexibility of the animal part.

11. Method according to claim 1, wherein the conveyor is an overhead conveyor, and wherein the bone holder depends from the overhead conveyor.

12. Method according to claim 11, wherein the downward force includes gravity.

13. Method according to claim 1, wherein the method is part of a meat processing operation.

14. Method according to claim 13, wherein the meat processing operation is one for separating meat from thigh bones.

15. Method according to claim 14, wherein the animal part is a thigh and the bone part grasped by the bone holder is a hip knuckle, and wherein the meat processing operation further includes the automated individual processing steps of:
  cutting tissue near a hip knuckle;
  cutting tissue adjacent a knee knuckle;
  engaging the thigh bone adjacent the bone holder with a meat stripper;
  moving the bone holder and meat stripper away from one another in a direction substantially coextensive with the longitudinal extend of the thigh bone;
  allowing the meat stripper to pass over the knee knuckle; and
  collecting the meat separated from the bone.

16. Method according to claim 14 wherein the skin from thigh is removed prior to separating the meat from the bone part extending therein.

17. Method according to claim 1, wherein the animal part is an item of poultry.

18. Method according to claim 17, wherein the item of poultry is one of a group consisting of chicken, quail, turkey, duck, swan, and goose.

19. Apparatus for performing the method of claim 1 including at least one processing station for carrying out the method steps;
  wherein the at least one processing station is arranged along a path of conveyance defined by a conveyor moving through a predefined path;
  wherein a bone holder is associated with the conveyor; and
  wherein the at least one processing station comprises a skin remover unit including the gripper means operatively arranged to, in use, entrap and pull a portion of skin of an animal part between a gap of the gripper means.

20. Apparatus according to claim 19, wherein the conveyor is an overhead conveyor, and wherein the bone holder is rotatably depending from the overhead conveyor.

21. Apparatus according to claim 19 wherein the gripper means includes a rotating gripper and a fixed knife blade, and wherein the gap is formed between a perimeter surface of the rotating gripper and the fixed knife blade, and wherein a first edge of the fixed knife blade extends parallel to the rotating gripper and substantially perpendicular to the direction of conveyance of the conveyor, and a main body of the fixed knife blade extends substantially tangentially to the perimeter contour of the rotating gripper.

22. Apparatus according to claim 21, wherein the knife blade is adjustable relative to the gripper.

23. Apparatus according to claim 21 wherein in use, the skin remover unit is arranged at a distance from the conveyor such that the animal is first engaged by the perimeter surface of the rotating gripper, before coming in contact with the fixed knife blade.

24. Apparatus according to claim 19 wherein the skin remover unit is adjustably mounted to a machine frame via an arm.

25. Apparatus according to claim 24, wherein the arm is pivotable with respect to the machine frame in a plane substantially inline with the overhead conveyor.

26. Apparatus according to claim 25, wherein the arm is pivotally mounted to the machine frame and pivoted about a mount point by an adjustment screw spindle that adjustably supports the arm at a contact point spaced from the mount point.

27. Apparatus according to claim 19 wherein the conveyor path is arranged in a closed loop and the closed loop is defined by first and second carousels, connecting parallel first and second linear conveyor sections.

28. Apparatus according to claim 27, wherein the second carousel is driven for rotation, and wherein the first carousel is idle and driven indirectly by the conveyer.

29. Apparatus according to claim 19 wherein the at least one processing station further comprises a animal part loading station, a first tissue cutting station, a second tissue cutting station, and a meat stripper station.

30. Apparatus according to claim 29, wherein the skin remover unit, is positioned after the loading station, and before the meat stripper station.

* * * * *